Reissued Sept. 20, 1932

Re. 18,600

UNITED STATES PATENT OFFICE

EDMUND A. ANDERSON AND GEORGE L. WERLEY, OF PALMERTON, PENNSYLVANIA, ASSIGNORS TO THE NEW JERSEY ZINC COMPANY, OF NEW YORK, N. Y., A CORPORATION OF NEW JERSEY

ZINC BASE DIE CASTING ALLOY

No Drawing. Original No. 1,852,442, dated April 5, 1932, Serial No. 476,946, filed August 21, 1930. Application for reissue filed August 4, 1932. Serial No. 627,534.

This invention relates to zinc base die-casting alloys and has for its object the provision of an improved alloy of this character.

The mechanical requirements of the die-casting operation necessitate the construction of the melting pot and die from iron and steel. These metals are subject to attack by molten zinc and it has been found from experience that at least 0.25% aluminum must be added to the zinc in order to minimize this attack sufficiently to secure reasonable life from the apparatus. Alloys for die-casting must possess a sufficient degree of fluidity to properly flow into and completely fill the dies used, and 2% or more aluminum appears to be necessary to secure an adequate degree of fluidity. It has also long been known that aluminum increases the tensile strength of zinc and this, in itself, makes its presence in zinc base die-casting alloys desirable in quantities of from 2% to as much as 10 to 15%.

Zinc-aluminum alloys containing less than about 80% of aluminum undergo a structural change subsequent to solidification which is commonly known as a phase change or more specifically in this case as a eutectoid reaction. This phase change consists in the formation of two crystalline forms or phases from one phase previously existing, and is accompanied by certain changes in physical properties of the alloy, such, for example, as increase in density, hardness and tensile strength and decrease in ductility and impact strength. This phase change may occur during the cooling of the alloy after casting or may through certain influences be retarded or inhibited. In such cases it may take place gradually over a period of months at ordinary temperatures.

A secondary stage of phase change which sometimes occurs is the growth or coalescence of the extremely small particles of the new phases as first formed into larger particles. This stage may be accompanied by softening and lowering of tensile strength and by an increase in ductility and impact strength.

Zinc-aluminum alloys in this range of composition are also subject to a type of disintegration commonly known as intercrystalline oxidation. In extreme cases, under the influence of warmth and moisture, intercrystalline oxidation may completely penetrate specimens of these alloys and cause swelling, warping and even complete disintegration. Intercrystalline oxidation is in some way associated with and partly dependent upon the phase change.

It has heretofore been recognized that certain other metals when present in these zinc-aluminum alloys exercise important effects on either the phase change or the intercrystalline oxidation or both. For example, copper and magnesium are known to exert an influence on the phase change either in respect to the rate at which it takes place or the completeness of the reaction or in some other respect not fully understood. The particular effect produced by copper and magnesium on the phase change reacts favorably in increasing the resistance of the alloys to intercrystalline oxidation. Lead, while not exerting any marked influence on the phase change, very seriously diminishes the resistance of these zinc-aluminum alloys to intercrystalline oxidation. Cadmium, though having a certain effect on the phase change, in the presence of lead usually diminishes the resistance of these alloys to intercrystalline oxidation.

In the course of an exhaustive investigation of zinc base die-casting alloys, we have found that the tendency of zinc-aluminum alloys to undergo intercrystalline oxidation is greatly diminished by the elimination of harmful impurities, notably lead and tin and under certain conditions cadmium. This was taken advantage of in the preferred composition of the alloy described in the United States Patent of Peirce and Anderson No. 1,596,761, dated August 17th, 1926, by the use of high grade zinc metal (e. g. Horsehead brand) as the zinc base of the alloy. High grade zinc metal, however, contains as much as 0.05% of lead and to produce an alloy sufficiently free from intercrystalline oxidation with this amount of lead present, additions of both copper and magnesium are necessary since these metals individually tend to retard or prevent intercrystalline oxidation and when present together have a more or less additive beneficial effect.

Continued experiments with zinc metal containing materially less lead than present in high grade zinc metal indicated definitely that there were important possibilities in this direction. The first important discovery was that if the percentage of lead and other impurities in the zinc metal (used in making up the zinc base alloy) was less than 0.02%, with tin substantially absent, the presence of 0.1% magnesium in an alloy containing 4% aluminum (and without copper) was sufficient to prevent intercrystalline oxidation, and that such an alloy had other desirable physical properties. The advantage gained by the elimination of copper from this alloy was primarily an increased impact strength with better retention of this impact strength upon ageing either at room temperature or elevated temperatures. This discovery constitutes the basis of a copending patent application, Serial No. 368,730, filed June 5, 1929 (which has since issued into United States Patent No. 1,779,525, of October 28, 1930). However, the elimination of copper from the 4% aluminum, 3% copper, 0.1% magnesium alloy resulted in a lower tensile strength which under some circumstances, might make the alloy less valuable.

We next discovered that it was not necessary to entirely eliminate the copper in order to obtain the advantageous characteristics of the last-mentioned alloy. On the contrary, we found that additions of copper up to 1% are accompanied by slightly improved tensile strength apparently without any corollary disadvantages. This discovery forms the basis of our copending patent application Serial No. 476,452; filed August 19, 1930.

Our present invention is based on the discovery that in an alloy made with zinc metal of high purity and containing aluminum, for example 4%, the presence of a small amount of copper (without magnesium), for example 1%, is sufficient to give substantially complete resistance to intercrystalline oxidation. As compared with the 4% aluminum, 0.1% magnesium zinc base alloy (without copper), made with the same grade of high purity zinc metal, the alloy containing 4% aluminum and 1% copper (without magnesium) has the advantage of a higher initial impact strength with a somewhat higher impact strength after ten days' exposure to air saturated with moisture at 95° C. The new alloy also has an appreciably higher tensile strength after such exposure.

The improved zinc base die-casting alloy of the present invention is, accordingly, substantially free of magnesium, and contains from about 2 to 10% aluminum, from about 0.05 to 2% copper, and is made up of a zinc metal base of high purity containing at least 99.98% zinc and preferably containing 99.99+% zinc. Our present preferred composition of the alloy of the invention is about 4% aluminum, about 1% copper and the balance zinc metal of high purity containing 99.99+% zinc. The zinc metal of high purity should contain not more than about 0.01% lead plus cadmium. Very satisfactory results have been secured with zinc metal containing 99.99+% zinc, less than 0.003% lead, less than 0.003% cadmium and less than 0.001% tin. Tin should be substantially excluded from the alloy and in no case should the tin content exceed about 0.001%.

The following tables illustrate the important physical properties of die-castings made of an alloy of the invention. Alloy No. 1 is of the composition described in United States Patent No. 1,596,761; alloy No. 2 is of the composition disclosed in my copending patent application Serial No. 368,730, alloy No. 3 is of the composition disclosed in our copending patent application Serial No. 476,452; filed August 19, 1930; and alloy No. 4 is of the composition embraced within the present invention.

*Composition*

| | Alloy No. 1 Pat. 1,596,761 | Alloy No. 2 S. N. 368,730 | Alloy No. 3 S. N. 476,452 | Alloy No. 4 of invention |
|---|---|---|---|---|
| Aluminum | 4.0% | 4.0% | 4.0% | 4.0% |
| Copper | 3.0% | ---------- | 1.0% | 1.0% |
| Magnesium | 0.1% | 0.1% | 0.1% | ---------- |
| Quality of zinc base. | High grade. | High purity 99.99% Zn. | High purity 99.99% Zn. | High purity 99.99% Zn. |

*Properties as cast*

| | | | | |
|---|---|---|---|---|
| Tensile strength flat | 46,200 | 39,400 | 42,700 | 40,800 |
| Tensile strength round | 45,600 | 37,300 | 43,100 | 41,800 |
| Impact strength | 108 | 130 | 169 | 288 |

*Properties after ten days in steam at 95° C.*

| | | | | |
|---|---|---|---|---|
| Tensile strength flat | 27,800 | 31,600 | 33,400 | 34,500 |
| Tensile strength round | 32,800 | 31,900 | 34,400 | 36,000 |
| Impact strength | 8 | 142 | 137 | 170 |
| Expansion ¾" wide | 0.0076 | 0.0012 | 0.0008 | 0.0006 |
| Expansion ½" wide | 0.0068 | 0.0016 | 0.0006 | 0.0007 |

The tensile strength is indicated in pounds per square inch for flat and round test specimens. The impact strength is indicated in foot pounds per square inch. Linear expansion is indicated in inches for test sections ¾ in. and ½ in. in width.

We claim:

1. A zinc base alloy consisting of about 4% aluminum, about 1% copper and the balance zinc metal of high purity with at least 99.98% zinc.

2. A zinc base alloy consisting of 2 to 5% aluminum, 0.05 to 2% copper, and in which the zinc base is zinc metal of high purity containing at least 99.98% zinc.

In testimony whereof we affix our signatures.

EDMUND A. ANDERSON.
GEORGE L. WERLEY.